United States Patent Office 2,970,674
Patented Feb. 7, 1961

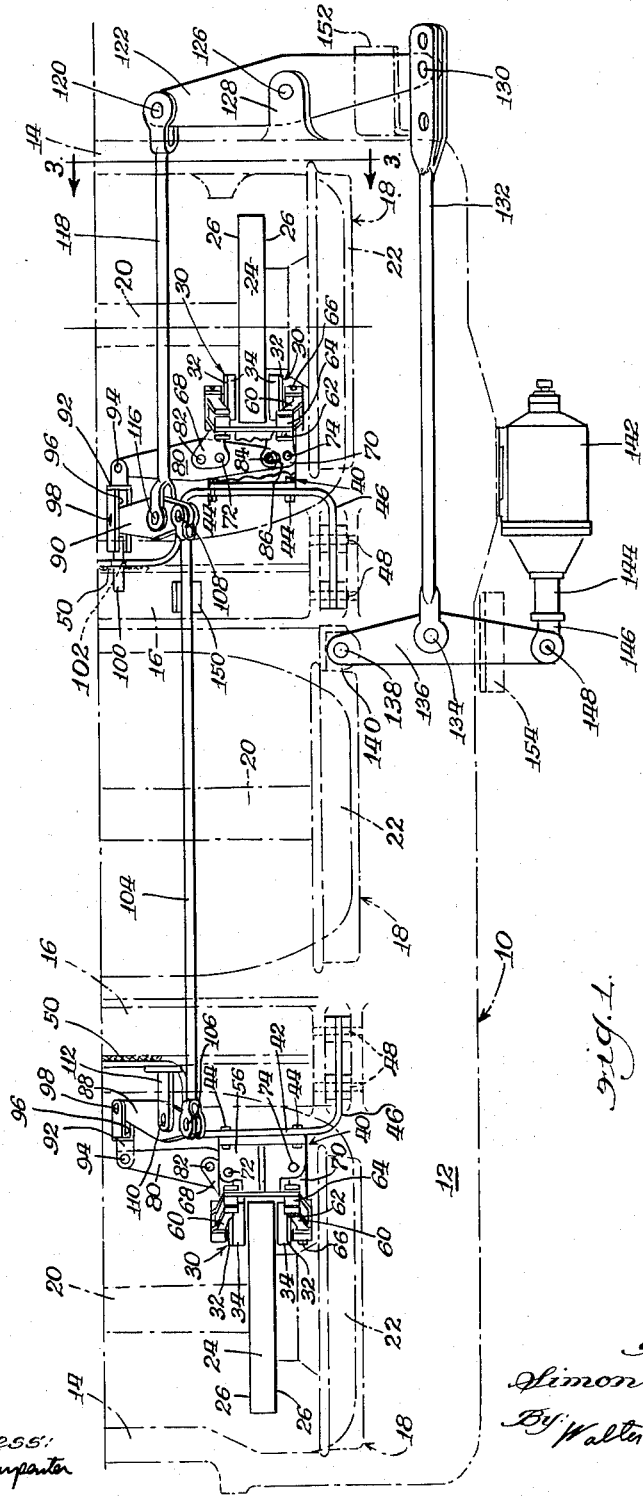

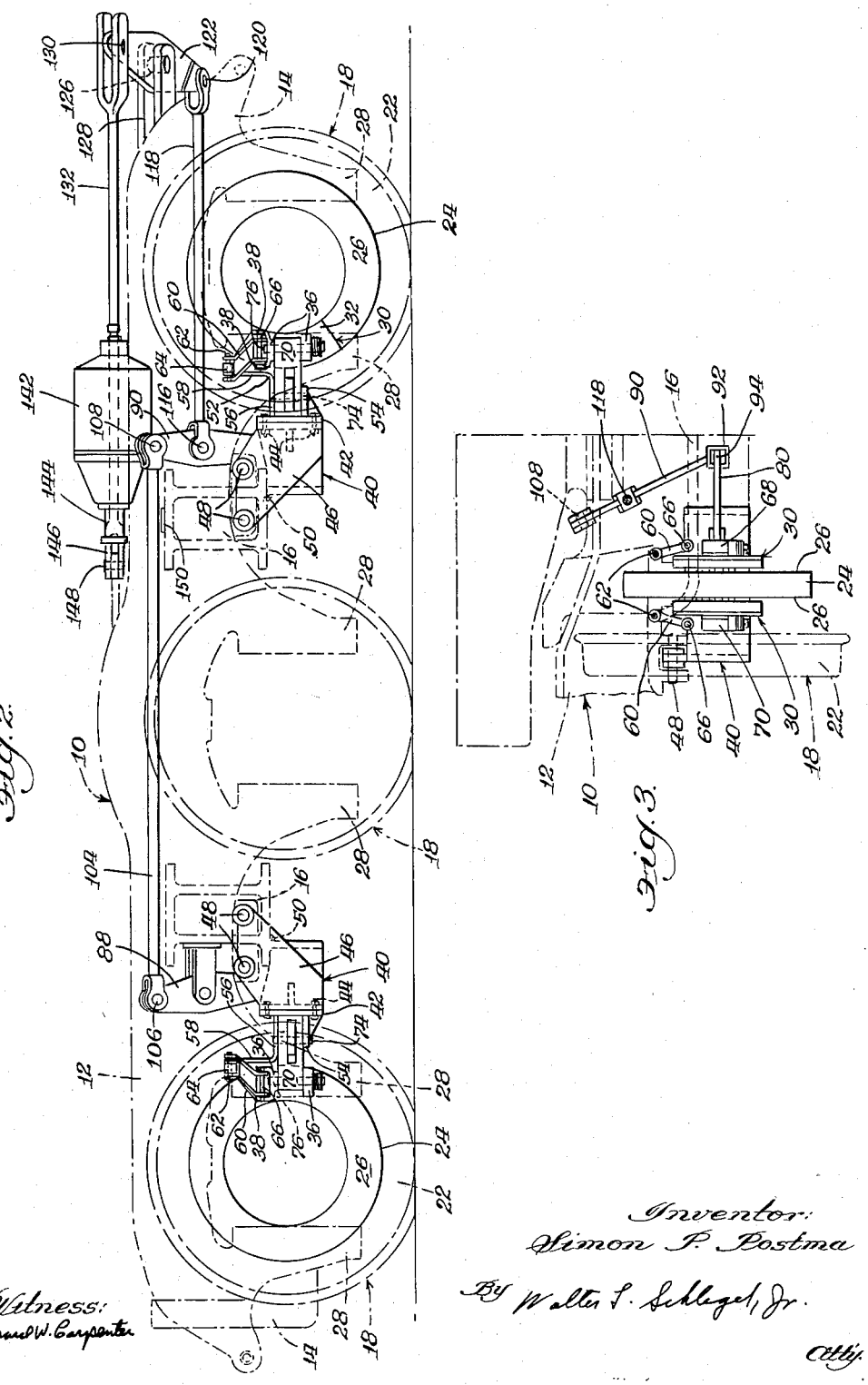

2,970,674

ROTOR BRAKE ARRANGEMENT

Simon P. Postma, Highland, Ind., assignor to American Steel Foundries, Chicago, Ill., a corporation of New Jersey Filed Sept. 12, 1958, Ser. No. 760,579

1 Claim. (Cl. 188—59)

This invention relates to brakes and more particularly to an improved rotor brake arrangement for railway vehicles.

The invention comprehends a rotor brake mounting and linkage arrangement for railway vehicle trucks wherein a pair of rotor brake mechanisms engageable with spaced wheel and axle assemblies are actuated by a common power source.

In the conventional rotor brake arrangements employed on railway vehicles separate rotor brake mechanisms each comprising friction means, brake levers, and a power cylinder are provided for deceleration of the rotor of each wheel and axle assembly.

It is a primary object of this invention, however, to provide an improved mounting and linkage arrangement wherein separate rotor brake mechanisms can be operated by a common power source.

A more specific object of the invention is the provision of a rotor brake arrangement wherein a pair of rotor brake mechanisms engageable with rotors of respective wheel and axle assemblies of a truck are actuated by a single power cylinder mounted on the truck frame.

These and other objects of the invention will be apparent from an examination of the following description and drawings, wherein:

Figure 1 is a fragmentary top plan view of one side of a railway vehicle truck to which has been applied a brake arrangement embodying features of the invention (only one side of the truck is shown as the opposite side may be provided with a similar arrangement);

Figure 2 is a side elevational view of the structure illustrated in Figure 1, and Figure 3 is a vertical section taken on line 3—3 of Figure 1.

It will be understood that certain elements have been intentionally omitted from certain views where they are better illustrated in other views.

Referring now to the drawings for a better understanding of the invention, it will be seen that a brake arrangement embodying features of the invention is shown as applied to a railway car truck having a truck frame, indicated generally at 10, comprising a pair of longitudinally extending side rails 12 interconnected at their ends by a pair of integral transversely extending end rails 14 and interconnected intermediate their ends by a pair of integral transversely extending transoms 16.

The frame is supported on three wheel and axle assemblies, indicated generally at 18, each of which comprises an axle 20 having secured thereto a pair of wheels 22, only one of which is shown. The end wheel and axle assemblies may each also include a rotatable friction member 24 presenting a pair of axially spaced oppositely facing friction surfaces 26. The axles may be provided at their ends with conventional journal means, not shown, received between spaced pairs of pedestal jaws 28 presented by side rails 12. Inasmuch as the truck is symmetrical about its longitudinal vertical center plane, only one side of the truck is illustrated in Figure 1 of the drawings.

Deceleration of each wheel and axle assembly is achieved by means of a pair of brake shoe assemblies indicated generally at 30, each comprising a brake shoe 34 secured to a brake head 32 which presents a pair of vertically spaced lugs 36 and a pair of horizontally spaced lugs 38.

The brake shoe assemblies associated with the respective wheel and axle assemblies may each be supported by a brake frame structure or support 40 comprising a vertically disposed transversely extending rear plate 42 detachably secured in any manner as by nut and bolt assemblies 44 to a mounting bracket 46, which in turn may be semi-permanently attached to the truck frame itself by means of nut and bolt assemblies 48 securing the outboard end of the bracket to the related side rail 12 and by welds 50 securing the inboard end of the bracket to the related transom 16.

The brake support itself comprises vertically spaced horizontally disposed upper and lower elements 52 and 54, respectively. The upper element is generally L-shaped as seen in side elevation and comprises a horizontal plate 56 and a vertical plate 58 integral with the edge of the horizontal plate remote from plate 42.

The brake shoe assemblies associated with each brake support 40 may be carried by the support by means of a pair of links 60 pivotally connected at their upper ends by pins 62 to lugs 64 presented by vertical plate 58 of upper element 52 and pivotally connected at their lower ends by pins 66 to brake head lugs 38.

Actuation of the brake shoe assemblies associated with each support 40 is achieved by means of a pair of generally bell crank shaped inboard and outboard horizontally disposed brake levers 68 and 70, respectively, which are fulcrumed intermediate their ends by pins 72 and 74, respectively to both the upper and lower elements of support 40. The outer or forward extremities of the brake levers may be pivotally connected by pins 76 to lugs 36 of the related brake heads 34.

The brake levers associated with each support 40 may be actuated by a transversely extending somewhat horizontally disposed actuating lever 80 which is fulcrumed intermediate its ends by common fulcrum pin 72 to the related support 40. Inboardly of its fulcrum point, lever 80 may be connected to the inboard brake lever by pin 82 whereby, as lever 80 is connected at two points to the inboard brake lever 68, the actuating lever and inboard brake lever can pivot as a unit about pin 72. At its outboard extremity lever 80 may be pivotally connected to the outboard brake lever 70 by pin 84 which is disposed to extend through an elongated hole or slot 86 in the outboard brake lever. If desired, this may be reversed with the hole in the actuating lever being elongated.

Movement of the respective actuating levers 80 may be achieved by a pair of dead and live somewhat vertically disposed operating levers 88 and 90, respectively, which are connected to the respective actuating levers by means of a pair of guide links 92. Each guide link 92 may be pivotally connected at its forward end by pin 94 to the inboard extremity of the related actuating lever 80. The guide link 92 presents intermediate its ends a slot 96 within which is disposed the lower extremity of the related operating lever which may be pivotally connected to the link by pin 98. At its rearward extremity the right hand link, as seen in Figure 1, which is associated with live lever 90, presents a preferably cylindrically shaped extension rod 100 adapted to be slidably received within aperture 102 presented by mounting bracket 42.

At their upper ends, the operating levers may be interconnected by a tension rod 104 which is pivotally connected at its opposite ends by pins 106 and 108 to levers 88 and 90, respectively.

As best seen in Figure 2, operating lever 88 is a dead lever fulcrumed intermediate its ends by pin 110 to bracket 112 mounted on the related transom 16. The right hand operating lever 90 is a live or floating lever pivotally connected intermediate its ends by pin 116 to one end of a tension rod 118 which in turn is pivotally connected at its opposite end by pin 120 to the inboard extremity of a power or truck lever 122.

Truck lever 122 is a dead lever fulcrumed intermediate its ends by pin 126 to bracket 122 mounted on a related end rail 14 and is pivotally connected at its outboard extremity by pin 130 to one end of a tension rod 132, the opposite end of which is pivotally connected by pin 134 to a second power lever or cylinder lever 136 intermediate the ends of the lever. Lever 136 is also a dead lever and is fulcrumed at its inboard end by pin 138 to a bracket 140 on the truck frame.

Actuation of the linkage is achieved by means of a power cylinder 142 mounted on the outboard side of rail 12 and comprising a piston 144 having extending therefrom a piston rod 146 which is pivotally connected by pin 148 to the outboard end of cylinder lever 136.

In order to provide additional support for the linkage, tension rod 104, truck lever 122 and cylinder lever 136 may be supported for sliding engagement thereon by means of support brackets 150 and 152 and 154, respectively, which may be mounted on the truck frame in and desired manner.

To describe the operation of the device, it will be seen that as power cylinder 142 is actuated, piston 144 and piston rod 146 move to the left, as seen in Figure 1, causing cylinder lever 136 to rotate in a clockwise direction about fulcrum point 138. The movement of lever 136 urges tension rod 132 to the left, thereby causing truck lever 122 to rotate in a clockwise direction about its fulcrum point 126 as seen in Figure 1. The movement of lever 122 urges pull rod 118 to the right, causing live operating lever 90 to rotate in a clockwise direction, as seen in Figure 1, about pin 108 and thereby move the related actuating lever 80, which in turn causes the related brake levers to carry their respective brake shoe assemblies into engagement with the friction surfaces 26 of the adjacent rotor. As the brake mechanism assocated with the right hand wheel and axle assembly assumes the applied position, the fulcrum point of floating lever 90 shifts from pin 108 to pin 98 and the operating lever 90 begins to move in a counter-clockwise, direction as seen in Figure 1, about pin 98, thereby urging tension rod 104 to the right. As the tension rod 104 moves to the right, it urges dead operating lever 88 to rotate in a counter-clockwise direction as seen in Figure 1 about pin 110 and thereby cause its related actuating lever 80 to urge the brake levers associated therewith to move their respective brake shoe assemblies into engagement with the friction surfaces presented by the rotor of the left hand wheel and axle assembly. It will be understood, of course, that all of the movements of the linkage occur at substantially the same time so that the brake mechanisms associated with the respective assemblies are able to act substantially simultaneously.

Thus, it will be seen that in the above described arrangement, I have provided an improved rotor brake arrangement wherein, through the use of a relatively simple linkage system, separate rotor brake mechanisms associated with the respective wheel and axle assemblies of a truck can be actuated by a common power cylinder mounted directly on the frame of the truck.

I claim:

In a brake arrangement for a railway vehicle truck having a truck frame including longitudinally extending side rails interconnected at their ends and intermediate their ends by end rails and transoms, respectively, and a pair of supporting wheel and axle assemblies each having a pair of axially spaced rotatable friction surfaces, the combination of: a power cylinder mounted on one of the side rails of the truck frame; brake supports mounted on the frame adjacent the friction surfaces of the respective assemblies; friction means disposed for engagement with the surfaces of the respective assemblies; pairs of brake levers fulcrumed to the respective supports and connected to the related friction means; a pair of dead actuating levers fulcrumed intermediate their ends to the respective supports and operatively connected to the related brake levers; a pair of operating levers operatively connected at their lower ends to the respective actuating levers, one of said operating levers being a dead lever fulcrumed intermediate its ends to one transom of the frame, the other of said operating levers being a live lever; a first pull rod directly interconnecting the upper ends of the operating levers; a dead truck lever fulcrumed intermediate its ends to one end rail of the frame; a dead cylinder lever fulcrumed at its inboard end to the frame and connected at its outboard end to the power cylinder; a second pull rod interconnecting the live operating lever intermediate its ends and the inboard end of the truck lever; and a third pull rod interconnecting the cylinder lever intermediate its ends and the outboard end of the truck lever.

References Cited in the file of this patent

UNITED STATES PATENTS

| 1,531,284 | Hedgcock | Mar. 31, 1925 |
|---|---|---|
| 1,947,675 | Schwentler | Feb. 20, 1934 |
| 1,987,658 | Aurien | Jan. 15, 1935 |
| 2,383,376 | Gaenssle | Aug. 21, 1945 |
| 2,627,944 | Simanek | Feb. 10, 1953 |
| 2,852,103 | Flesch | Sept. 16, 1958 |
| 2,877,871 | Tack | Mar. 17, 1959 |